United States Patent
Zollinger et al.

(10) Patent No.: US 7,803,899 B2
(45) Date of Patent: Sep. 28, 2010

(54) METHODS TO REDUCE ORGANIC IMPURITY LEVELS IN POLYMERS AND PRODUCTS MADE THEREFROM

(75) Inventors: Mark L. Zollinger, Memphis, TN (US); James Andrew Ward, Eads, TN (US)

(73) Assignee: Buckman Laboratories International, Inc., Memphis, TN (US)

(*) Notice: Subject to any disclaimer, the term of this patent is extended or adjusted under 35 U.S.C. 154(b) by 324 days.

(21) Appl. No.: 11/528,703

(22) Filed: Sep. 27, 2006

(65) Prior Publication Data

US 2007/0106061 A1    May 10, 2007

Related U.S. Application Data

(60) Provisional application No. 60/720,940, filed on Sep. 27, 2005.

(51) Int. Cl.
C08G 63/69    (2006.01)
C08G 63/02    (2006.01)

(52) U.S. Cl. .................. 528/480; 424/78.3; 424/78.17; 424/78.27

(58) Field of Classification Search ................ 424/78.3, 424/78.17, 78.27; 528/480
See application file for complete search history.

(56) References Cited

U.S. PATENT DOCUMENTS

| | | | |
|---|---|---|---|
| 2,926,116 A | 2/1960 | Kelm | |
| 2,926,154 A | 2/1960 | Keim | |
| 2,944,952 A * | 7/1960 | McMinn, Jr. ................. | 205/688 |
| 2,982,749 A | 5/1961 | Friedrich et al. | |
| 3,284,393 A | 11/1966 | Vanderhoff et al. | |
| 3,607,622 A | 9/1971 | Espy | |
| 3,738,945 A | 6/1973 | Panzer et al. | |
| 3,826,771 A | 7/1974 | Anderson et al. | |
| 3,874,870 A | 4/1975 | Green et al. | |
| 3,894,946 A | 7/1975 | Panzer et al. | |
| 3,894,947 A | 7/1975 | Panzer et al. | |
| 3,898,336 A | 8/1975 | Rembaum et al. | |
| 3,930,877 A | 1/1976 | Aitken | |
| 3,931,319 A | 1/1976 | Green et al. | |
| RE28,808 E | 5/1976 | Panzer et al. | |
| 4,025,627 A | 5/1977 | Green et al. | |
| 4,027,009 A * | 5/1977 | Grier et al. ................ | 424/78.08 |
| 4,027,020 A | 5/1977 | Green et al. | |
| 4,046,750 A * | 9/1977 | Rembaum .................... | 526/310 |
| 4,054,542 A | 10/1977 | Buckman et al. | |
| 4,089,977 A | 5/1978 | Green et al. | |
| 4,104,161 A | 8/1978 | Wein | |
| 4,111,679 A | 9/1978 | Shair et al. | |
| 4,147,627 A | 4/1979 | Goodman | |
| 4,164,521 A | 8/1979 | Goodman | |
| 4,166,041 A | 8/1979 | Goodman | |
| 4,172,887 A | 10/1979 | Vanlerberghe et al. | |
| 4,176,107 A | 11/1979 | Buckman et al. | |
| 4,310,434 A | 1/1982 | Choy et al. | |
| 4,396,552 A | 8/1983 | Knobloch et al. | |
| 4,477,363 A | 10/1984 | Wong et al. | |
| 4,506,081 A | 3/1985 | Fenyes et al. | |
| 4,581,058 A | 4/1986 | Fenyes et al. | |
| 4,606,773 A | 8/1986 | Novak | |
| 4,654,341 A | 3/1987 | Nelson et al. | |
| 4,683,072 A | 7/1987 | Holdt et al. | |
| 4,769,155 A | 9/1988 | Dwyer | |
| 4,778,813 A | 10/1988 | Fenyes et al. | |
| 4,820,449 A | 4/1989 | Menke et al. | |
| 4,876,003 A | 10/1989 | Casberg | |
| 4,911,858 A | 3/1990 | Bunczk et al. | |
| 4,960,590 A | 10/1990 | Hollis et al. | |
| 4,961,872 A | 10/1990 | Sinclair | |
| 4,970,211 A | 11/1990 | Fenyes et al. | |
| 5,051,124 A | 9/1991 | Pera | |
| 5,087,457 A | 2/1992 | Bryant et al. | |
| 5,093,078 A | 3/1992 | Hollis et al. | |
| 5,128,100 A | 7/1992 | Hollis et al. | |
| 5,142,002 A | 8/1992 | Metzner | |
| 5,164,109 A | 11/1992 | Wojtowicz | |
| 5,205,955 A | 4/1993 | Bunczk et al. | |
| 5,382,323 A | 1/1995 | Furman, Jr. et al. | |
| 5,401,881 A | 3/1995 | Puckett et al. | |
| 5,419,897 A | 5/1995 | Drake et al. | |
| 5,498,415 A | 3/1996 | Jones | |
| 5,637,308 A | 6/1997 | Del Corral et al. | |
| 5,681,862 A | 10/1997 | Hollis et al. | |
| 5,880,154 A * | 3/1999 | Boukrinskaia et al. ...... | 514/561 |
| 6,342,580 B1 | 1/2002 | Laurent et al. | |
| 6,677,389 B2 * | 1/2004 | Fukuda et al. ................ | 516/84 |
| 2004/0164018 A1 * | 8/2004 | Mitchell et al. .......... | 210/502.1 |

FOREIGN PATENT DOCUMENTS

| | | |
|---|---|---|
| FR | 2 736 644 | 1/1997 |
| GB | 1 601 123 | 10/1981 |
| WO | WO 9702744 * | 1/1997 |

OTHER PUBLICATIONS

International Search Report and Written Opinion of the International Searching Authority for PCT/US2006/037657 dated Mar. 9, 2007.

* cited by examiner

*Primary Examiner*—Terressa M Boykin
(74) *Attorney, Agent, or Firm*—Kilyk & Bowersox, P.L.L.C.

(57) ABSTRACT

Various methods are described for preparing dry water-soluble polymers with reduced organic impurity content by combining water-soluble polymer in water with at least one dry polar solvent to form a mixture that separates into a first layer comprising a majority of the solvent and water and a second layer comprising a majority of the polymer, then separating the layers and drying the second layer to obtain a solid comprising the water-soluble polymer. Further, or solid polymer products having reduced organic impurity levels and/or moisture content are also described.

23 Claims, No Drawings

METHODS TO REDUCE ORGANIC IMPURITY LEVELS IN POLYMERS AND PRODUCTS MADE THEREFROM

This application claims the benefit under 35 U.S.C. §119 (e) of prior U.S. Provisional Patent Application No. 60/720,940, filed Sep. 27, 2005, which is incorporated in its entirety by reference herein.

BACKGROUND OF THE INVENTION

The present invention relates to polymers, and more particularly relates to water-soluble polymers having low organic chemical impurity levels and methods to achieve the same. The present invention also relates to dry or solid water-soluble polymers and methods of making the same. The present invention further relates to the use of dry water-soluble polymers for a variety of applications.

Biological fouling is a persistent nuisance or problem in all varieties of aqueous systems. Biological fouling can have a direct adverse economic impact when it occurs in industrial process waters, for example in cooling waters, metal working fluids, or other recirculating water systems such as those used in papermaking or textile manufacture. If not controlled, biological fouling of industrial process waters can interfere with process operations, lowering process efficiency, wasting energy, plugging the water-handling system, and even degrading product quality.

Biological fouling of recreational water systems such as pools, spas, or decorative (or ornamental) water systems, (e.g., ponds or fountains), can severely detract from people's enjoyment of them. Biological fouling often results in objectionable odors. More importantly, particularly in recreational waters, biological fouling can degrade the water quality to such an extent that it becomes unfit for use and may even pose a health risk.

Sanitation waters, like industrial process waters and recreational waters, are also vulnerable to biological fouling and its associated problems. Sanitation waters include, for example, toilet water, cistern water, and sewage treatment waters. Due to the nature of the waste contained in sanitation waters, these water systems are particularly susceptible to biological fouling.

Ionene polymers have often been used to control or prevent biological fouling, including biofilm and slime formation, in aqueous systems. Advantageously, ionene polymers, or polymeric quaternary ammonium compounds (polyquats), generally do not foam excessively in water or aqueous systems, do not irritate skin, and exhibit extremely low toxicity to warm-blooded animals. These characteristics along with their ability to control or prevent biological fouling cause ionene polymers to be excellent choices for water treatment.

Ionene polymers are commonly sold and used as liquid compositions such as aqueous solutions or formulations. Solid forms, including tablets, of ionene polymers have been disclosed in U.S. Pat. Nos. 5,142,002 and 5,419,897. Other water treatment chemicals are often sold in solid forms, such as tablets or pucks. The following patents describe various solid forms of water treatment chemicals for use in a number of different aqueous systems: U.S. Pat. Nos. 4,310,434, 4,396,522, 4,477,363, 4,654,341, 4,683,072, 4,820,449, 4,876,003, 4,911,858, 4,961,872, and 5,205,955 as well as U.K. Patent No. 1,601,123, PCT Application WO 91/18510, PCT Application WO 92/13528, and European Patent Application No. 0 525 437 A1.

When making various polymers, such as water-soluble polymers, for instance, ionene polymers, some of the reactants or by-products, which are in the form of organic impurities, remain after the polymer is formed. These impurities can be detrimental when present with the polymer based on the applications for the polymer, such as in water treatment or the treatment of aqueous systems. Accordingly, there is a need to remove these various organic impurities, such as TMEDA, dioxane, epichlorohydrin, or derivatives thereof, acrylic acid, acrylamide, and the like.

In some applications solid forms provide advantages over liquid compositions. Well formulated solid forms provide increased stability and reduce exposure to chemicals, solvents, or vapors. In a solid, different ingredients may be successfully combined where such a combination in a liquid might lead to unwanted reactions and potential loss of activity. Using a solid form, a chemical composition can often be packaged and shipped in a more concentrated form than with liquid compositions. Solid forms can also reduce or eliminate concerns regarding the liquid spilling or containers breaking during shipping or handling.

At the point of use, solid forms may also offer additional advantages over liquid formulations. Solid forms provide unit dosing and a uniform delivery system reducing errors in amounts used. Solid forms of water treatment chemicals can also be formulated to provide sustained or prolonged release of chemical to the aqueous system.

As shown by the above discussion, it would be desirable to combine the biological efficacy of an ionene polymer or other polymer with the advantages of a solid formulation. Solid forms of water-soluble polymers would compliment the utility of liquid polymer formulations. Accordingly, there exists a need for solid forms of water-soluble polymers, like ionene polymers, useable in water treatment and other uses.

Generally, in the past, dry polymers have been obtained by heating the water-soluble polymer present in an aqueous solution in order to evaporate the water and thereby obtain the solid which can have a glass-like consistency. Afterwards, the solid can be reduced to powder form or other forms. Also, polymers, such as water-soluble polymers, have been formed into granules by mixing an aqueous solution of a polymer, such as an ionene polymer, with a carrier matrix, such as a salt, to form a moist mass which is then dried to form granules.

In each of these methods, enormous efforts are made to subject the wet polymer to sufficient heat in order to evaporate the water or moisture to obtain a solid. This takes enormous time and energy costs. In addition, the moisture content generally is 20% or higher, even after the product is obtained in solid form since driving off any additional moisture would be difficult or not possible for a variety of reasons. In addition, these processes do not typically remove any organic chemical impurities that may be present in the polymer.

Thus, there is a need to provide methods which can obtain dry water-soluble polymers that preferably have a low moisture or water content, and which can avoid the time consuming and/or energy costs of previous methods.

There is also a need to provide polymers having low organic chemical impurity levels and to provide methods to achieve this.

SUMMARY OF THE PRESENT INVENTION

A feature of the present invention is to provide methods to reduce organic impurity levels in the polymer and/or to obtain dry or solid water-soluble polymers.

A further feature of the present invention is to provide water-soluble polymers having low organic chemical impurity levels and/or dry water-soluble polymers having a low moisture content.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a method of preparing at least one water-soluble polymer by combining a water-soluble polymer in water or other aqueous solution with at least one dry polar solvent, such as a protic or aprotic solvent, to form a first layer. The water or other aqueous solution should preferably be miscible with the polar solvent. The first layer contains the dry polar solvent, or at least a portion thereof, and the water or aqueous solution or at least a portion thereof. A second layer is also formed which contains at least the water-soluble polymer or at least a portion thereof. The method further includes separating the first layer from the second layer and then drying the second layer to obtain a solid containing the water-soluble polymer. The method can include repeating the first several steps by adding additional polar solvent and separating the layers again, prior to the drying of the second layer to obtain the solid, which contains the water-soluble polymer. The water-soluble polymer obtained preferably has low organic chemical impurity levels.

The present invention further relates to a method of forming water-soluble polymers, such as ionene polymers, by conducting polymerization of at least two monomers that form the water-soluble polymer, such as ionene polymer, in a polar solvent, and in the substantial absence of water.

The present invention further relates to a method of forming a water-soluble polymer, such as an ionene polymer, by conducting polymerization of at least two monomers that form the water-soluble polymer, such as ionene polymer, in the absence of any separate aqueous or non-aqueous solvent.

Also, the present invention relates to a method to reduce organic impurity levels in the polymer by utilizing the methods of the present invention. The present invention further relates to water-soluble polymers having low organic chemical impurity levels.

The present invention also relates to a water-soluble polymer solid, such as a granule or powder, having a moisture content of below 15% by weight, based on the weight of the polymer.

Further, the present invention relates to a water-soluble polymer solid, such as a powder or granule, having a polar solvent content of from about 10 ppm to about 1,000 ppm.

The present invention, in addition, relates to a water-soluble polymer solid, such as a powder or granule, having a moisture content of below 15% by weight and a polar solvent content of from about 10 ppm to about 1,000 ppm, based on the weight of the polymer.

It is to be understood that both the foregoing general description and the following detailed description are exemplary and explanatory only and are intended to provide a further explanation of the present invention, as claimed.

DETAILED DESCRIPTION OF THE PRESENT INVENTION

In one or more embodiments, the present invention relates to a method of preparing water-soluble polymers. The present invention further relates to water-soluble polymers in solid form, such as powder or granule form, which have a low moisture content and/or have a polar solvent level present, and/or have a low organic chemical impurity level.

In at least one embodiment, the present invention relates to a method of preparing a water-soluble polymer, for instance, a dry water-soluble polymer. For purposes of the present invention, the term "dry" is a reference to the water-soluble polymer being in solid form. For instance, the solid that is formed or obtained can be any solid form, such as granules, powder, pucks, cake, tablets, blocks, discs, and the like. The solid can have any shape or size. The dry water-soluble polymer formed from the methods of the present invention can still have a moisture content, but the polymer is in solid form. For instance, the solid can have a glass-like appearance or consistency, especially prior to significant drying. Since the present invention relates to water-soluble polymers, these polymers are generally completely or highly soluble in aqueous solutions, such as water. Therefore, the dry water-soluble polymer of the present invention in its dry state is a water-soluble polymer that is not present or soluble or dissolved in a liquid or dispersed in liquid form. The dry water-soluble polymer can be introduced into water or an aqueous solution in order to become soluble, dispersed, or dissolved in the water or aqueous solution.

In one method of the present invention, the dry water-soluble polymer is formed by combining at least one water-soluble polymer which is dissolved or solublized in water with a dry polar solvent to ultimately form a first layer and a second layer. The first layer generally contains at least a portion of the dry polar solvent and water. A second layer is also formed at this stage and generally contains at least a portion of the water-soluble polymer. The first layer preferably contains a majority, if not a large majority, of the dry polar solvent, as well as a significant amount, if not a majority, of the water that was initially present with the water-soluble polymer. The second layer preferably contains a majority, if not a large majority, of the water-soluble polymer that is initially present and the remaining amount of water originally present. As an example, the first layer can contain at least 80% by weight of the overall dry polar solvent present and at least 20% by weight of the overall water originally present. The first layer can contain at least 90% by weight of the overall dry polar solvent and at least 25% by weight of the overall water originally present. The first layer can contain from about 70% by weight to about 99% or more by weight of the overall dry polar solvent present and from about 70% by weight to about 90% by weight of the water originally present. The second layer, which contains the water-soluble polymer, preferably contains at least 80% by weight of the water-soluble polymer present, and more preferably at least 90% by weight of the water-soluble polymer present. Suitable ranges include from about 77% to about 99% or more by weight of the water-soluble polymer present in the second layer. At this point, the water-soluble polymer is in a precipitated state or in a gel-like state since it has been, at least in part, separated from the water or aqueous solution.

The method then further includes separating the first layer from the second layer and then drying the second layer to obtain a solid containing the water-soluble polymer. The polar solvent has the ability to be miscible with the water present with the water-soluble polymer, and thereby remove portions of the water when the layers are separated.

In one or more embodiments of the present invention, the method can include taking the second layer after it has been separated from the first layer and combining it with additional dry polar solvent, which can be the same or different from the first dry polar solvent used, to form a mixture that then separates into two layers as before. These two layers can then be separated. This step of adding additional solvent to the previously separated second layer and separating the two layers that form can be optionally repeated one or more times prior to any drying of the separated second layer. The repeating of the steps that add additional dry polar solvent can generally lead to the removal of additional, remaining amounts of organic impurities and/or water or moisture from the water-soluble polymer. For instance, these steps can be repeated one, two, three, four, five, six, or more times. Needless to say, there is a point of diminishing returns where the benefit of repeating the step of adding additional dry polar solvent does not outweigh the amount of organic impurities and/or water or moisture further removed from the water-soluble polymer by the additional steps.

In this method, the combining of the water-soluble polymer that is dissolved or soluble in water with the dry polar solvent can be done in any conventional fashion. Generally, the water-soluble polymer in water is from a previous process of forming the water-soluble polymer, which generally occurs in an aqueous-based medium. Thus, in the present invention, after the formation of the water-soluble polymer, the method of the present invention can be immediately practiced. Alternatively, the methods of the present invention can be practiced at any point once the water-soluble polymer is present or dissolved in water. The combining of the water-soluble polymer with dry polar solvent can simply be by pouring the liquid containing the water-soluble polymer into a dry polar solvent or vice versa to form a mixture which separates into a first layer and second layer. Mixing can occur. Any manner of combining two liquids can be used in the present invention and can occur in any container or holding tank. The present invention can be practiced at any stage of the water-soluble polymer, meaning, while fully in solution, partially, or the solid polymer can be used. When a solid polymer is used, generally large amounts of dry polar solvent are used to avoid potential high viscosity problems.

The separating of the first liquid from the second liquid can occur in any fashion in which two layers are separated, wherein one layer is mostly or completely a liquid and the other layer is a solid or a solid partially dissolved in water. For instance, the first layer, which is completely liquid or mostly liquid, can simply be drawn off by decanting the top layer by any conventional chemical technique. Various ways of separating the first layer from the second layer include, but are not limited to, filtering, and the like. When the first layer is separated from the second layer, it is to be understood that the first layer contents and the second layer contents may not be entirely separated from each other due to the limitations of the technology or simply because of technique, time, or cost constraints. Preferably, the entire, or substantially entire, first layer is separated from the second layer, though this is not absolutely critical to the present invention, especially if additional dry polar solvent is added one or more times prior to the drying of the second layer.

The drying of the second layer, which contains the water-soluble polymer, can occur by any drying techniques, such as the application of heat and/or vacuum. Preferably, the second layer containing the solid water-soluble polymer occurs by the application of heat, such as in a furnace or oven, at a temperature of, for example, from about 35° C. to about 250° C. or more and, more preferably, from about 50° C. to about 200° C. for any amount of time, such as 1 hour to 100 hours or more. It is to be understood that depending upon the type of water-soluble polymer present, the moisture or water content remaining in the solid water-soluble polymer, the temperature used for drying, and the time that the drying occurs can vary.

With respect to the dry polar solvent, any one or more dry polar solvents can be used in the present invention. For example, the dry polar solvent can be an alcohol, acetone, methanol, ethanol, isopropanol, tetrahydrofuran, acetonitrile, 1-propanol, pyridine, TMEDA, and the like, or mixtures thereof. The dry polar solvents(s) is preferably anhydrous.

Preferably, the dry polar solvent contains 10 wt % or less moisture in the dry polar solvent themselves. More preferably, the dry polar solvent contains 5% or less by weight water and, more preferably, 1% by weight water in the dry polar solvent. For instance, the dry polar solvent can contain from about 0% to about 2.5 wt % water or moisture by weight of the dry polar solvent.

With respect to the amount of dry polar solvent used to form the mixture, which ultimately separates into a first layer and second layer, generally, any amount of dry polar solvent can be used as long as it is sufficient to result in the formation of a mixture which separates into a first layer and a second layer, as described above. For instance, the dry polar solvent can be present with the water-soluble polymer that is in water or dissolved in water at a volume ratio of at least 1:1. In other words, the amount of dry polar solvent can at least equal the volume of the water-soluble polymer and water that is present. The ratio can be at least 1.5:1; 2:1, 2.5:1, 3.5:1, or higher by volume of dry polar solvent to water-soluble polymer that is present.

Once the separating of the first layer from the second layer occurs, the water-soluble polymer can have a glass-like consistency or other appearances, especially those commonly associated with very wet solid polymers. Upon substantial drying, the water-soluble polymer can be present in solid form. This solid form, which can be in a cake-like form or other form, can be crushed, milled, hammer-milled, or otherwise reduced to granule or powder form. The powder size can be any shape or size desirable for various applications. The particle distribution of the powder can be any desirable particle size distribution. There are no limitations to the solid form that can be taken upon obtaining the solid, or dry water-soluble polymer. For instance, the dry water-soluble polymer can be in tablets, block form, pellet form, cake form, powder form, granule form, agglomerated form, and the like.

In the present invention, the polar solvent present in the first layer can be reused in the same on-going method or for subsequent batches. The dry polar solvent present in the first layer can be separated from the water or reused by any conventional means, such as by distillation and the like.

In one embodiment, the present invention can be operated on a batch-by-batch basis, a semi-continuous basis, or a continuous basis. Generally, an operation can be set up wherein the methods of the present invention are practiced on a continuous basis and, optionally, the dry polar solvent is recycled or reused for the continuous method.

With the present invention, the use of a polar solvent permits the removal of water or moisture in the water-soluble polymer solid, thus resulting in the use of less energy. In one embodiment, the drying of the second layer is a drying of the water-soluble polymer to remove or evaporate the dry polar solvent that may be present. In another embodiment, the drying of the water-soluble polymer removes or evaporates solvent and/or water that is present, or at least a portion thereof. In addition, with the present invention, some amount of polar solvent may be present with the dry water-soluble polymer (i.e., polymer in solid form) and can more easily be removed since the polar solvent has a lower boiling point and, therefore, it takes less energy to remove the solvent than water. In one or more embodiments, the present invention, with the use of polar solvents, has the ability to remove one or more impurities that may be present with the water-soluble polymer and which may be soluble in organic solvents, like polar solvents. Thus, the present invention provides numerous advantages over the previous process which simply dried the polymer by the application of heat to remove moisture.

When various water-soluble polymers are made from reacting various monomers, various by-products can be made which are unwanted in the final product. For instance, when wet strength resins are made, generally a large amount of epichlorohydrin is used and there are times when the epichlorohydrin is not totally used in the reaction (i.e., unreacted portions). Thus, it is desirable to remove epichlorohydrin and/or its derivatives and/or analogs thereof in the final product. Thus, with the present invention, various organic chemicals such as low molecular weight impurities can be removed such as TMEDA, epichlorohydrin, derivatives of epichlorohydrin, dioxane, and the like.

For instance, in one embodiment of the present invention, the present invention relates to a wet strength resin, such as AMREZ 25HP, from Georgia Pacific, which has a low molecular weight impurity level, such as from about 50 ppm to about 1%, or from 500 ppm to about 2000 ppm. For instance, the low molecular weight impurity can be or can include epichlorohydrin, derivatives of epichlorohydrin, and the like.

As another example, the various ionene polymers described herein and, for instance, set forth by formula herein, can have a low molecular weight impurity level of from 50 ppm to 5,000 ppm or from about 0.1 wt % to about 1%, wherein the low molecular weight impurity can be or includes TMEDA, dioxane, and the like. The low molecular weight impurity can have an average molecular weight of 50,000 or less, such as 100 to 50,000 MW, or 100 to 10,000 MW, or 100 to 5,000 MW, or 100 to 1,000 MW, or 100 to 500 MW.

In a further embodiment of the present invention, the present invention relates to a water-soluble polymer solid having a moisture content of below 15% by weight. More preferably, the water-soluble polymer solid has a moisture content of below 11% by weight and, even more preferably, a moisture content of below 5% by weight of the water-soluble polymer solid. For instance, the water-soluble polymer solid can have a moisture content of from about 0.5 wt % to about 15 wt %, or from about 2 wt % to about 10 wt % by weight of the water-soluble polymer solid. The water-soluble polymer solid can have any shape or size. The water-soluble polymer solid can have a powder form, granule form, cake form, block form, tablet form, and the like.

In an additional embodiment of the present invention, the present invention relates to a water-soluble polymer solid having a polar solvent content of from about 5 ppm to about 1,000 ppm or more. Other ranges can include from about 10 ppm to about 500 ppm or from about 100 ppm to about 300 ppm. As stated above, the water-soluble polymer solid can have any shape or size and can be in any form, such as powder form, granule form, block form, cake form, tablet form, and the like.

In a further embodiment of the present invention, the present invention relates to a water-soluble polymer solid having a combined moisture content described above and the polar solvent content described above. Any combination of the various ranges can be present.

In addition, the water-soluble polymer solid of the present invention can have a low impurity level with respect to impurities soluble in organic solvents (e.g., a polar organic solvent, like acetone, alcohols, pyridine, and the other examples described earlier). For instance, the water-soluble polymer solids of the present invention can have a impurity level of from about 5 ppm to about 1,500 ppm or from about 15 ppm to about 100 ppm with respect to impurities that are soluble in organic solvents. Examples of such impurities include, but are not limited to, acrylic acid, acrylamide, and the like.

In a further embodiment of the present invention, the present invention relates to a method of forming a water-soluble polymer, such as an ionene polymer, by conducting a polymerization of at least two monomers that form the water-soluble polymer, wherein the polymerization occurs in at least one polar solvent and in the substantial absence of water. The polymerization can be optionally heated to increase the speed of polymerization. For instance, the polymerization occurring in at least one polar solvent can occur at a temperature of from about 63° C. to about 84° C. Any type of heating device can be used, such as, but not limited to, electric, steam heated jacket, and the like. With respect to the substantial absence of water, preferably, no water is present. In more practical terms, generally, the substantial absence of water means that there is less than 2% by weight based on all ingredients present and, more preferably, less than 0.1% by weight, based on all ingredients present during the polymerization.

In another embodiment of the present invention, the present invention relates to a method of forming a water-soluble polymer, such as an ionene polymer, by conducting the polymerization of at least two monomers that form the water-soluble polymer in the absence of any separate aqueous or non-aqueous solvent. In this method, the formation of the water-soluble polymer is in a solvent-less system. The reference to the absence of any separate aqueous or non-aqueous solvent is a reference to the fact that the monomers may contain some components which may be considered solvent. In the present method, no separate addition of any solvent of any sort is added for purposes of conducting the polymerization. In this method, the monomers alone are sufficient to permit the polymerization to form the water-soluble polymer. In conducting the polymerization, heating can be applied to increase the speed of polymerization. For instance, the heating can be at a temperature of from about 80° C. to about 200° C., such as from about 90° C. to about 180° C., using any heating technique.

With respect to the water-soluble polymers that can benefit from the methods of the present invention, any water-soluble polymer that can be recovered in solid form can benefit from the methods of the present invention. There is no limitation to the water-soluble polymers. For instance, the water-soluble polymer can be an ionene polymer or a polymeric quaternary ammonium composition. The water-soluble polymer can be a water-soluble vinyl addition polymer. The water-soluble polymer can be an anionic or cationic polymer, including polyacrylamide or polyacrylic acid.

Ionene polymers or polymeric quaternary ammonium compounds (polyquats), i.e., cationic polymers containing quaternary nitrogens in the polymer backbone (also known as polymeric quats or polyquats), belong to a well-known class of compounds. The biological activity of this class of polymers is also known. See, e.g., A. Rembaum, Biological Activity of Ionene Polymers, Applied Polymer Symposium No. 22, 299-317 (1973) and O. May, "Polymeric Antimicrobial Agents" in Disinfection, Sterilization, and Preservation, S. Block, Ed., 322-333 (Lea & Febiger, Philadelphia, 1991). Ionene polymers have a variety of uses in aqueous systems such as microbicides, bactericides, and algicides as well as controlling, even preventing, biofilm and slime formation. U.S. Pat. Nos. 4,970,211; 4,176,107; 5,382,323; 5,681,862; 4,960,590; 5,637,308; 5,087,457; 5,093,078; and 5,401,881 provide examples of various water-soluble polymers that can benefit from the present invention, and these patents (and all patent and publications mentioned throughout) are incorporated in their entirety by reference herein. These patents further describe commercially-available water-soluble polymer sources, such as from Buckman Laboratories International, Inc.

Preferred examples of water-soluble polymers are ionene polymers and poly(aminoamides). Ionene polymers have a variety of uses in aqueous systems such as microbicides, bactericides, algicides, sanitizers, and disinfectants. U.S. Pat. Nos. 3,874,870, 3,898,336, 3,931,319, 4,027,020, 4,054,542, 4,089,977, 4,111,679, 4,506,081, 4,581,058, 4,778,813, 4,970,211, 5,051,124, 5,128,100, 5,142,002, and 5,093,078, the disclosures of all of which are specifically incorporated by reference herein, give various examples of these polymers and their uses.

Ionene polymers may be classified according to the repeating unit found in the polymer. This repeating unit results from the reactants used to make the ionene polymer. A first type of ionene polymer comprises the repeating unit of formula I:

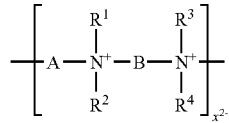

In this formula, $R^1$, $R^2$, $R^3$, and $R^4$ can be identical or different, and are selected from H, $C_1$-$C_{20}$ alkyl optionally substituted with at least one hydroxyl group, and benzyl optionally substituted on the benzene moiety with at least one $C_1$-$C_{20}$ alkyl group. Preferably, $R^1$, $R^2$, $R^3$ and $R^4$ are all methyl or ethyl.

The group "A" is a divalent radical selected from $C_1$-$C_{10}$ alkyl or alkylene, $C_2$-$C_{10}$ alkenyl or alkenylene, $C_2$-$C_{10}$ alkynyl or alkynlene, $C_1$-$C_{10}$ hydroxyalkyl or hydroxyalkylene, symmetric or asymmetric di-$C_1$-$C_{10}$-alkylether, aryl (or arylene), aryl-$C_1$-$C_{10}$-alkyl (or alkylene), or $C_1$-$C_{10}$-alkylaryl-$C_1$-$C_{10}$ alkyl (or $C_1$-$C_{10}$ alkylenearyl —$C_1$-$C_{10}$ alkylene). "A" can be $C_1$-$C_5$ alkyl, $C_2$-$C_5$ alkenyl, $C_2$-$C_5$ hydroxyalkyl, or symmetric di-$C_2$-$C_5$-alkylether, and most preferably "A" is propylene, 2-hydroxypropylene or diethyleneether. "A" can be a divalent $C_1$-$C_5$ alkylene, $C_2$-$C_5$ alkenylene, $C_2$-$C_5$ hydroxyalkylene, or symmetric di-$C_2$-$C_5$-alkylenether, and most preferably "A" is —$CH_2CH_2CH_2$—, —$CH_2CH(OH)CH_2$— or —$CH_2CH_2OCH_2CH_2$—.

The group "B" is a divalent radical selected from $C_1$-$C_{10}$ alkylene, $C_2$-$C_{10}$ alkenylene, $C_2$-$C_{10}$ alkynylene, $C_1$-$C_{10}$ hydroxyalkylene, arylene, arylene-$C_1$-$C_{10}$-alkylene, or $C_1$-$C_{10}$-alkylenearyl-$C_1$-$C_{10}$-alkylene. Preferably, "B" is $C_1$-$C_5$ alkylene, $C_2$-$C_5$ alkenylene, $C_2$-$C_5$ hydroxyalkylene, arylene, arylene-$C_1$-$C_5$-alkylene, or $C_1$-$C_5$ alkylenearyl-$C_1$-$C_5$-alkylene. Most preferably "B" is —$CH_2CH_2$—, —$CH_2CH_2CH_2$—, —$CH_2CH_2CH_2CH_2$—, or —$CH_2(CH_2)_4CH_2$—.

The counter ion, $X^{2-}$, is a divalent counter ion, two monovalent counter ions or a fraction of a polyvalent counter ion sufficient to balance the cationic charge in the repeating unit which forms the ionene polymer backbone. Preferably, $X^{2-}$ is two monovalent anions selected from a halide anion and a trihalide anion and more preferably, chloride or bromide. Ionene polymers having trihalide counter ions are described in U.S. Pat. No. 3,778,476. The disclosure of that patent is incorporated herein by reference.

The ionene polymers having the repeating unit of formula I may be prepared by a number of known methods. One method is to react a diamine of the formula $R^1R^2N$—B—$NR^1R^2$ with a dihalide of the formula X-A-X. Ionene polymers having this repeating unit and methods for their preparation are, for example, described in U.S. Pat. Nos. 3,874,870, 3,931,319, 4,025,627, 4,027,020, 4,506,870 and 5,093,078; the disclosures of which are incorporated herein by reference. The biological activity of ionene polymers having the repeating unit of formula I is also described in these patents.

A second type of ionene polymer comprises the repeating unit of formula II:

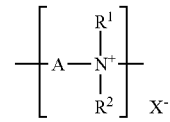

In this formula II, the definitions of $R^1$, $R^2$, and A are the same as those defined above for formula I. $X^-$ is a monovalent counter ion, one-half of a divalent counter ion or a fraction of a polyvalent counter ion sufficient to balance the cationic charge of the repeating unit which forms the ionene polymer. $X^-$ may be, for example, a halide or trihalide anion and is preferably chloride or bromide.

The ionene polymers having the repeating unit of formula II may be prepared by known methods. One method is to react an amine of the formula $R^1R^2N$ with a haloepoxide such as epichlorohydrin. Ionene polymers having the repeating unit of formula II are, for example, described in U.S. Pat. Nos. 4,111,679 and 5,051,124, the disclosures of which are incorporated herein by reference. The biological activity of ionene polymers having the repeating unit of formula II is also described in these patents.

A third type of ionene polymer comprises a repeating unit of formula III:

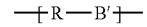

wherein R is

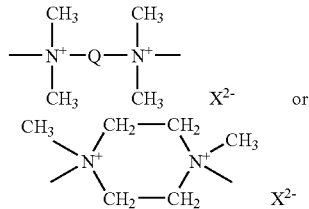

Q is —(CHR')$_p$—, —$CH_2$—CH=CH—$CH_2$—, —$CH_2$—$CH_2$—O—$CH_2$—$CH_2$—, —$CH_2$—CH(OH)—$CH_2$—, or

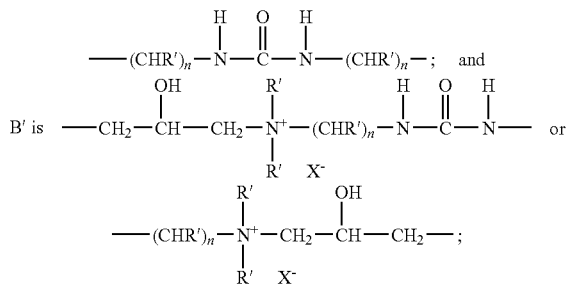

The group B' is $\{-[CH_2-CH(OH)-CH_2-N^+R'_2-(CHR')_n-NH-C(O)-NH]-, X^-\}$ or $\{-[(CHR')_n-N^+R'_2-CH_2-CH(OH)-CH_2]-, X^-\}$. The variables n and p independently vary from 2 to 12. Each R' is independently hydrogen or a lower alkyl group. $X^{2-}$ is a divalent counter ion, two monovalent counter ions, or a fraction of a polyvalent counter ion sufficient to balance the cationic charge in the group R. $X^-$ is a monovalent counter ion, one half of a divalent counter ion or a fraction of a polyvalent counter ion sufficient to balance the cationic charge in the group B'. Preferably, R' is hydrogen or $C_1$-$C_4$ alkyl, n is 2-6, and p is 2-6. Most preferably, R' is hydrogen or methyl, n is 3 and p is 2. Preferred counter ions for $X^{2-}$ and $X^-$ are the same as those discussed above for formulae I and II.

The polymers of formula III are derived from bis(dialkylaminoalkyl) ureas, which are also known as urea diamines, by known methods. Ionene polymers of the formula III, methods of their preparation, and their biological activities are, for example, described in U.S. Pat. No. 4,506,081; the disclosure of which is incorporated herein by reference.

Ionene polymers comprising the repeating units of formulae I, II, and III may also be cross-linked with primary, secondary or other polyfunctional amines using means known in the art. Ionene polymers can be cross-linked either through the quaternary nitrogen atom or through another functional group attached to the polymer backbone or to a side chain.

Cross-linked ionene polymers, prepared using cross-linking coreactants, are disclosed in U.S. Pat. No. 3,738,945 and Reissue U.S. Pat. No. 28,808, the disclosures of which are incorporated here by reference. The Reissue Patent describes the cross-linking of ionene polymers prepared by the reaction of dimethylamine and epichlorohydrin. The cross-linking coreactants listed are ammonia, primary amines, alkylenediamines, polyglycolamines, piperazines, heteroaromatic diamines and aromatic diamines.

U.S. Pat. No. 5,051,124, the disclosure of which is incorporated herein by reference, describes cross-linked ionene polymers resulting from the reaction of dimethylamine, a polyfunctional amine, and epichlorohydrin. Methods of inhibiting the growth of microorganisms using such cross-linked ionene polymers are also described.

Other examples of various cross-linked ionene polymers and their properties are provided in U.S. Pat. Nos. 3,894,946, 3,894,947, 3,930,877, 4,104,161, 4,164,521, 4,147,627, 4,166,041, 4,606,773, and 4,769,155. The disclosures of each of these patents is incorporated herein by reference.

The ionene polymers comprising the repeating units of formulae I, II, or III may also be capped, i.e., have a specific end group. Capping may be achieved by means known in the art. For example, an excess of either reactant used to make the ionene polymer can be employed to provide a capping group. Alternatively, a calculated quantity of a monofunctional tertiary amine or monofunctional substituted or unsubstituted alkyl halide can be reacted with an ionene polymer to obtain a capped ionene polymer. Ionene polymers can be capped at one or both ends. Capped ionene polymers and their microbicidal properties are described in U.S. Pat. Nos. 3,931,319 and 5,093,078, the disclosures of each of these patents is incorporated herein by reference.

Among the ionene polymers discussed above, a particularly preferred ionene polymer having a repeating unit of formula I is poly[oxyethylene(dimethyliminio)ethylene (dimethyliminio)ethylene] dichloride. In this ionene polymer, $R^1$, $R^2$, $R^3$ and $R^4$ are each methyl, A is $-CH_2CH_2OCH_2CH_2-$, B is $-CH_2CH_2-$, and $X^{2-}$ is $2Cl^-$, and the average molecular weight is 1,000-5,000. This ionene polymer is available from Buckman Laboratories, Inc. of Memphis, Tenn. as Busan® 77 product, a 60% aqueous dispersion of the polymer, or WSCP® product, a 60% aqueous dispersion of the polymer. Busan® 77 and WSCP® are biocides used primarily in aqueous systems, including metalworking fluids for microorganism control.

Another particularly preferred ionene polymer having a repeating unit of formula I, also available from Buckman Laboratories, Inc. as Busan® 79 product, or WSCP II product is the ionene polymer where $R^1$, $R^2$, $R^3$ and $R^4$ are each methyl, A is $-CH_2CH(OH)CH_2-$, B is $-CH_2CH_2-$, and $X^{2-}$ is $2Cl^-$. This ionene polymer is a reaction product of N,N,N',N'-tetramethyl-1,2-ethanediamine (TMEDA), with (chloromethyl)-oxirane, and has a 1,000-5,000 average molecular weight. The polymer product Busan® 79 or WSCPH product is a 60% aqueous solution of the polymer.

Preferred ionene polymers having the repeating unit of formula II are those where $R^1$ and $R^2$ are each methyl, A is $-CH_2CH(OH)CH_2-$, and $X^-$ is $Cl^-$. Busan® 1055 product is a 50% aqueous dispersion of such an ionene polymer obtained as a reaction product of dimethylamine with (chloromethyl)oxirane having a 2,000-10,000 average molecular weight.

Busan® 1157 product is a 50% aqueous dispersion of the ionene polymer having the repeating unit of formula II, obtained as a reaction product of dimethylamine with epichlorohydrin, cross-linked with ethylenediamine, where $R^1$ and $R^2$ are each methyl, A is $-CH_2CH(OH)CH_2-$ and $X^-$ is $Cl^-$. This ionene polymer has a 100,000-500,000 average molecular weight. Another ionene polymer having the repeating unit of formula II can be obtained as a reaction product of dimethylamine with epichlorohydrin, where $R^1$ and $R^2$ are each methyl, A is $-CH_2CH(OH)CH_2-$ and $X^-$ is $Cl^-$. This ionene polymer has a 5,000-10,000 average molecular weight, and is available from Buckman Laboratories, Inc. in a 50% aqueous solution as the BUSAN® 1055 product.

Busan® 1155 product is a 50% aqueous dispersion of an ionene polymer having the repeating unit of formula II, where $R^1$ and $R^2$ are each methyl, A is $-CH_2CH(OH)CH_2-$, $X^-$ is $Cl^-$ and the ionene polymer is cross-linked with ammonia. This ionene polymer has a molecular weight of approximately 100,000-500,000.

Busan® 1099 product or Bubond® 65 product is a 25% aqueous dispersion of a cross-linked ionene polymer having repeating units of formula II, where $R^1$ and $R^2$ are each methyl, A is $-CH_2CH(OH)CH_2-$, $X^-$ is $Cl^-$, the cross-linking agent is monomethylamine. This ionene polymer has a molecular weight of approximately 10,000-100,000.

Preferred ionene polymers having the repeating unit of formula III are those where R is a urea diamine and B' is $CH_2CH(OH)CH_2$, and $X^-$ is $Cl^-$. ASTAT product and BL® 1090 are a 50% aqueous dispersion of the ionene polymer obtained as a reaction product of N,N'-bis-[1-(3-(dimethylamino)-propyl]urea and epichlorohydrin, such an ionene polymer having a 2,000-15,000, preferably 3,000-7,000, average molecular weight.

Each of the above ionene polymers and products identified by trade name is available from Buckman Laboratories International, Inc. of Memphis Term.

Another polymer that can benefit from the present invention are adhesives having cross-linked cationic polymeric structures, such as those in Structure I below:

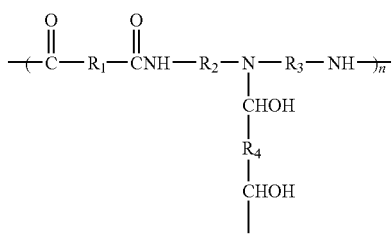

wherein $R_1$ is a linear or branched alkylene group containing from 1 to 8 carbon atoms.

$R_2$ and $R_3$ may be the same, or may be different, and are linear or branched alkylene groups containing from 2-8 carbon atoms; and $R_4$ is $(CH_2)_x$, wherein x is 0 to 6; and wherein n is a whole number of sufficient size to yield a molecular weight of at least 15,000.

The adhesive can comprise the reaction products of the backbone polyaminoamide polymers with from 0.1 molar ratio, to the copolymer repeating unit, of either the multifunctional aldehyde or the dialdehyde to about 1.1 molar ratio, to the copolymer repeating unit, of the multi-functional aldehyde, which aldehyde has been reacted with the base polymer which contains polyaminoamide polymers. Preferably, the base polymer is formed by reacting adipic acid with diethylenetriamine in mole ratios ranging from about 1.2:1.0 to 1.0:1.2.

The adhesive can comprise a cationic polyaminoamide polymer cross-linked with from 0.2 to about 0.5 molar ratio of a difunctional aldehyde having the structure:

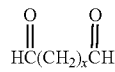

wherein x ranges from 0 to 6. The difunctional aldehyde can be glutaraldehyde.

The polyaminoamide backbone polymer can be made by condensing a difunctional carboxylic acid or ester with a multi-functional polyamine.

For example, a di-functional carboxylic acid having the structure:

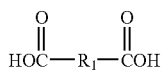

wherein $R_1$ is a linear or branched alkylene group having from one to eight carbon atoms may be reacted with a polyamine having the structure: $H_2N$—$R_2$—$NH$—$R_3$—$NH_2$ wherein $R_2$ and $R_3$ may be the same or different and are linear or branched alkylene groups containing from 2-8 carbon atoms.

The backbone cationic polyaminoamide polymer is made up of dimeric repeating units, such as in the structure:

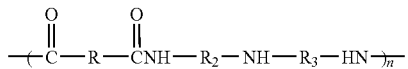

wherein n is an integer providing a weight average molecular weight of at least 5,000, and can be at least 7,500, or higher.

The above dicarboxylic acid can be a diacid containing at least four carbon atoms, and can be adipic acid, i.e.

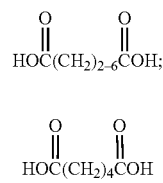

such as,

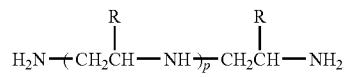

The polyamine above can be those polyamines obtained from condensation reactions of ethylene and propylene amine, or mixtures thereof, which polyamines have the structure:

$$H_2N\text{---}(CH_2CH\overset{R}{|}\text{---}NH)_p\text{---}CH_2CH\overset{R}{|}\text{---}NH_2$$

wherein R is chosen at each occurrence, from the group consisting of H, $CH_3$, or mixtures thereof; and $p$ is an integer ranging from 1-8, such as 1-4, or 1-2.

Each such backbone polymer, or mixtures of said backbone polymers (since the reaction product can contain mixtures both in terms of different acids and/or different amines, and also with different molecular weights, both with the same or different difunctional acids and/or polyamine), must contain at least one, and preferably more than one secondary amine group, which is the preferred reaction site for cross-linking with the dialdehyde.

The reaction conditions and variants to obtain the backbone polymers are described below, and also have been described in the following references: Gen. Offen. D.E. 2,456,638 and U.S. Patent Nos. 2,926,116; 2,926,154; and 3,607,622.

Another example of a polymer that can benefit are water-soluble vinyl addition polymers, such as those having units selected from the formulas A, B, and C.

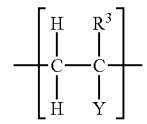
(A)

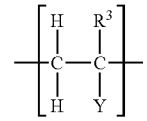
(B)

-continued

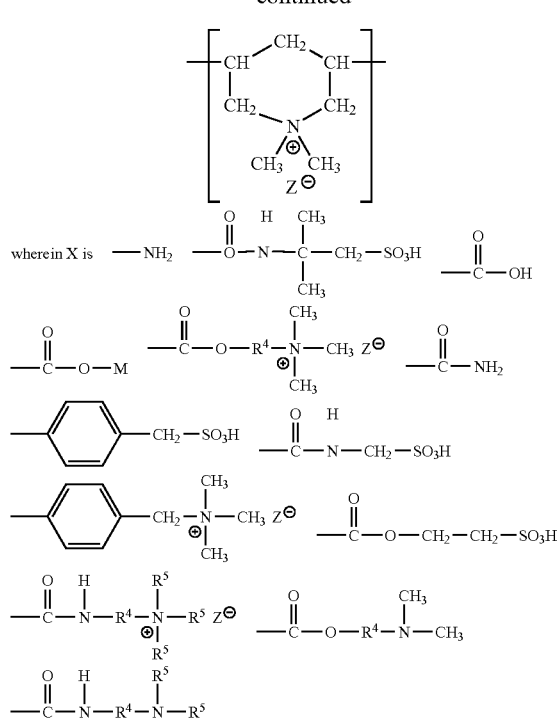

wherein Y is phenyl, nitrile, carbomethoxy, or carboethoxy and characterized in that all of the A units may contain the same X or two or three different X groups and further characterized in that M is alkali metal, alkaline earth metal, or ammonium; $R^3$ is hydrogen or methyl.

$R^4$ is alkylene containing 1 to 4 carbon atoms; $R^5$ is lower alkyl containing 1 to 4 carbon atoms; Z is an anion. The unit B can be present only in combination with unit A and in minor amounts.

Such materials are well known to those skilled in the art and include either solid materials or the aqueous polymer phase which results from heterogeneous polymerizations wherein an aqueous phase is dispersed in a water-insoluble organic phase. These are frequently referred to as water-in-oil polymerizations. Such polymers may be non-ionic, cationic, anionic, or amphoteric, depending upon the nature of the ethylenically unsaturated monomers which are used in their preparation.

Non-ionic, water-soluble, vinyl addition polymers result from the polymerization of acrylamide or methacrylamide. They also result from copolymerization of acrylamide or methacrylamide with other ethylenically unsaturated monomers, such as acrylonitrile, styrene, acrylate or methacrylate esters, and the like, in such proportions that the resultant polymer is water-soluble.

Anionic polymers result from the polymerization of acrylic acid or its salts, methacrylic acid or its salts, vinylbenzylsulfonic acid or its salts, 2-acrylamido-2-methylpropane sulfonic acid or its salts, or 2-sulfoethylmethacrylate or its salts, and the like. Included in this category of anionics are copolymers of the above described anionic monomers with the non-ionic monomers, acrylamide, methacrylamide, and the like.

Cationic polymers are formed from dimethylaminoalkylacrylates and methacrylates and their quaternary derivatives, dimethylaminopropylmethacrylamides and quaternary derivatives, diallyldimethylammonium halides, and vinylbenzyltrialkylammonium chlorides. Similarly, copolymers of these cationic monomers with the non-ionic monomers, acrylamide, methacrylamide, and the like are included.

Included in the above definition of anionic and cationic polymers are the reaction products of non-ionic polymers with chemical reagents to furnish anionic or cationic functionality. For example, anionic functionality can be produced by hydrolysis of polyacrylamide to various degrees of acrylate content, while reaction with formaldehyde and bisulfite provides sulfonate functionality. Alternately, polyacrylamide can be reacted with hypochlorite or hypobromite by the Hoffmann reaction to give amine functionality, or reacted with formaldehyde and a dialkylamine to furnish the Mannich amine derivative. Such amines can be alkylated to form the quaternaries.

Polyampholytes contain both cationic and anionic functionality in the same polymer molecule. Such molecules can be formed by copolymerization of anionic monomers such as those listed above, with cationic monomers such as those described above. Alternately, an anionic or cationic polyelectrolyte can be chemically modified to provide the polyampholyte. For example, a copolymer of acrylamide and sodium acrylate can be reacted with formaldehyde and dialkylamine to furnish a polyampholyte containing acrylate with amine functionality.

Included in the definition of the water-soluble polymer are the products of solution polymerization and water-in-oil heterogeneous polymerization. The polyelectrolyte can be in the form of an aqueous polymer phase. Both the inverse suspension polymerization method of Friedrich, et al. (U.S. Pat. No. 2,982,749), and the inverse emulsion polymerization methods of Vanderhoff, et. al. (U.S. Pat. No. 3,284,393) and Anderson, et. al. (U.S. Pat. No. 3,826,771), are included in this latter category. Examples include the polymer-water phase which results from suspension polymerization of a water-soluble vinyl monomer dispersed in a water-insoluble organic phase.

The dry water-soluble polymers of the present invention can be used in any application, such as in the water treatment area, papermaking area, sludge treatment area, cooling water, to control the growth of at least one microorganism, and the like, as explained in the above-identified patents.

The present invention will be further clarified by the following examples, which are intended to be exemplary of the present invention.

EXAMPLES

Example 1

500 ml of WSCP® polymer (plant grade), 100 ml of 36% ammonia, and 25 g of decolorizing carbon were charged to a 2 L 3 neck flask, with mechanical mixer, reflux condenser, under a nitrogen gas blanket, stopper and heating mantle. The ingredients were heated, with mixing, to reflux and continued for 1 hour. The mixture was cooled to room temperature and the carbon was removed by filter press. The filtered material was charged to a 2 L 3 neck flask with mechanical mixer and 2 stoppers, and 1 L of dry acetone was added and mixed for 30 min. The top layer was decanted and discarded. The bottom layer was poured into a suitable container and placed in a heated vacuum desscator set at 250° F., 23 in Hg until dry.

Example 2

500 ml of APCA polymer (plant grade) from Buckman Laboratories International, Inc., was charged to a 3 neck flask with mechanical mixer and 2 stoppers. 1 L of dry acetone was added and mixed for 30 min. The top layer was decanted and discarded. The bottom layer was poured into a suitable container and placed in a heated vacuum desscator set at 250° F., 23 in. Hg until dry.

Example 3

850 ml of Busan® 1157 polymer (plant grade) and 1700 ml of dry acetone were charged to a 3 L 3 neck flask with mechanical mixer and 2 stoppers and mixed for 30 min. The top layer was decanted and discarded. The bottom layer was poured into a suitable container and placed in a heated vacuum desscator set at 250° F., 23 in. Hg until dry.

This method can work using any dry, polar solvent such as methanol, ethanol, isopropanol, tetrahydrofuran, acetonitrile, and the like. In practice, a great deal of effort is used to mix the ever thicker polymer, e.g., WSCP® polymer, with the solvent, and preferably washing with more than one portion of dry solvent. In a follow-up example, a much larger amount of acetone was used and mixing was done with a Cowles mixer for a long time (e.g., at least 1 hour), decanting the solvent, and repeating this procedure 3 or more times, eventually reaching 11 wt % moisture as measured by NMR.

Example 4

500 ml of Amrez 25 HP polymer (Georgia Pacific) and 500 ml of acetone were charged into a flask and stirred until dissolved. An additional 500 ml of acetone was added to separate the resin from the acetone/water layer, and the top layer was decanted and discarded. 200 ml of water was charged and mixed until dissolved. 500 ml of additional acetone (portion wise) was charged and mixed for 30 minutes. The mixing was stopped, and allowed to settle, and then the top layer was decanted and discarded. The water and acetone additions were repeated 2 more times. This method further showed the removal of non-reactants present in the Amrez polymer, such as EPI, and EPI analogs and/or their derivatives.

Example 5

3.2 L of a solution made from 1.784 kg of ATMEDA, 2.756 kg of DCEE and 1.86 L of isopropyl alcohol, was charged to a 5 L bottom drain vessel with mechanical stirrer reflux condenser, and under a nitrogen gas blanket. The mixture was heated to reflux and monitored by GPC. 1.6 L of isopropyl alcohol was added to thin. The procedure was repeated with remaining starting materials. In the present invention, the alcohol or other solvent can be removed by any technique, such as a heated vacuum dessicator, which was used in this example. The polymer solid was then pulverized in a Waring blender. The solvent can be removed by spray-drying.

Example 6

100 ml Bufloc 5555 (polyacrylamide/DADMAC copolymer), and 100 ml acetone were charged into a 500 ml Erlenmyer flask and stirred with a spatula. After a short induction period, the polymer precipitated from the water/acetone layer. The top layer was decanted off, and the bottom layer was transferred to a round bottom flask and excess acetone was removed in vacuo on a rotory evaporator. Water was then added to again dilute the polymer to its original volume of 100 ml and free acrylamide was measured by GC. The start level was measured as 0.3 wt % free acrylamide, and the final level was 0.04 wt % free acylamide.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of preparing dry water-soluble polymer comprising:
    a) combining a water-soluble polymer in water with at least one dry polar solvent to form a mixture that separates into a first layer comprising a majority of said dry polar solvent and water and a second layer comprising a majority of said water-soluble polymer, wherein said water-soluble polymer is an ionene polymer, a polyaminoamide polymer, or a polyacrylamide/diallyldimethyl-ammonium halide copolymer;
    b) separating said first layer from said second layer; and
    c) drying said second layer to obtain a solid comprising said water-soluble polymer, wherein said water-soluble polymer having at least one polar solvent content or impurity level selected from:
        a polar solvent content of from about 5 ppm to about 1,000 ppm,
        a low molecular weight organic impurity level of from about 50 ppm to about 5,000 ppm, wherein the low molecular weight organic impurity has an average molecular weight of 50,000 or less,
        an epichlorohydrin or daughter thereof impurity level of from about 50 ppm to about 5,000 ppm, and
        an impurity level of from 5 ppm to about 1,500 ppm with respect to impurities soluble in an organic solvent.

2. The method of claim 1, further comprising after step b) and before step c) combining said second layer with additional dry polar solvent to form a mixture that separates into two layers, and optionally repeating this step one or more times prior to conducting step c).

3. The method of claim 1, wherein said water-soluble polymer is an ionene polymer.

4. The method of claim 1, wherein said dry polar solvent is acetone or an alcohol.

5. The method of claim 1, wherein said dry polar solvent comprises less than 10 wt % moisture.

6. The method of claim 1, wherein the ratio of said dry polar solvent to said water-soluble polymer in water is at least 1:1 by volume.

7. The method of claim 1, further comprising reducing said solid comprising said water-soluble polymer to powder form.

8. The method of claim 1, further comprising after step b), removing at least a portion of said water present in said first layer to recover dry polar solvent to re-use in said method.

9. The method of claim 1, wherein said method is operated on a continuous basis.

10. An ionene polymer powder having a polar solvent content of from about 5 ppm to about 1,000 ppm.

11. The ionene polymer powder of claim 10, wherein said polymer powder has a moisture content of below 12% by weight.

12. The method of claim 1, further comprising mixing at least one other dry chemical with said solid water soluble polymer and forming a solid material.

13. The ionene polymer powder of claim 10, further having a low molecular weight organic impurity level of from about 50 ppm to about 5,000 ppm, wherein the low molecular weight organic impurity has an average molecular weight of 50,000 or less.

14. The ionene polymer powder of claim 13, wherein said low molecular weight organic impurity is TMEDA, dioxane, or both.

15. A wet strength resin powder comprising wet strength resin and an epichlorohydrin or daughter thereof impurity level of from about 50 ppm to about 5,000 ppm, wherein said wet strength resin powder is a polyaminoamide polymer.

16. A water-soluble polymer solid comprising water-soluble polymer and an impurity level of from 5 ppm to about 1,500 ppm with respect to impurities soluble in an organic solvent, wherein said water-soluble polymer is an ionene polymer, a polyaminoamide polymer, or a polyacrylamide/diallyl-dimethylammonium halide copolymer.

17. The water-soluble polymer solid of claim 16, wherein said organic solvent is a polar organic solvent.

18. The water-soluble polymer solid of claim 16, wherein said organic solvent is acetone.

19. The water-soluble polymer solid of claim 16, wherein said impurities comprise acrylamide, acrylic acid, or both.

20. The method of claim 1, wherein said second layer is pourable after said separating and before said drying.

21. The method of claim 1, wherein said water-soluble polymer is provided as dissolved or solubilized in water for said combining.

22. The method of claim 1, wherein said water-soluble polymer is a cross-linked ionene polymer or a crosslinked polyaminoamide polymer.

23. The water-soluble polymer solid of claim 16, wherein said water-soluble polymer is a cross-linked ionene polymer or a crosslinked polyaminoamide polymer.

* * * * *

UNITED STATES PATENT AND TRADEMARK OFFICE
CERTIFICATE OF CORRECTION

PATENT NO. : 7,803,899 B2  Page 1 of 1
APPLICATION NO. : 11/528703
DATED : September 28, 2010
INVENTOR(S) : Zollinger et al.

It is certified that error appears in the above-identified patent and that said Letters Patent is hereby corrected as shown below:

Title page item 57
IN THE ABSTRACT:

Line 8, "Further, or solid" should read --Further, dry or solid--.

Signed and Sealed this

Ninth Day of November, 2010

David J. Kappos
*Director of the United States Patent and Trademark Office*